United States Patent
Stortz et al.

(10) Patent No.: US 12,223,036 B1
(45) Date of Patent: Feb. 11, 2025

(54) INJECTED BYTE BUFFER DATA CLASSIFICATION

(71) Applicant: CrowdStrike, Inc., Sunnyvale, CA (US)

(72) Inventors: Florian Stortz, London (GB); Felix Schwyzer, Berlin (DE); Marian Radu, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/628,172

(22) Filed: Apr. 5, 2024

(51) Int. Cl.
*G06F 21/54* (2013.01)
*G06F 21/56* (2013.01)

(52) U.S. Cl.
CPC ............ *G06F 21/54* (2013.01); *G06F 21/566* (2013.01)

(58) Field of Classification Search
CPC .. G06F 21/50–577; H04L 63/14–1466; G06N 20/00; G06N 20/10
See application file for complete search history.

(56) References Cited

U.S. PATENT DOCUMENTS

| | | | |
|---|---|---|---|
| 9,712,560 B2 | 7/2017 | Sivan et al. | |
| 11,416,612 B2 | 8/2022 | Strogov et al. | |
| 11,765,202 B2 | 9/2023 | Devi et al. | |
| 2011/0041179 A1 | 2/2011 | Stahlberg | |
| 2018/0077178 A1 | 3/2018 | Beauchesne et al. | |
| 2021/0352093 A1* | 11/2021 | Hassanzadeh | H04L 63/1416 |
| 2024/0022600 A1* | 1/2024 | Zhang | H04L 63/1466 |

OTHER PUBLICATIONS

Dan Brown, "What Sets Falcon Apart: Intelligent Host Sensors", Crowdstrike Blog, Dec. 8, 2015, 4 pages.
Horton, et al., "Bytes Are All You Need: Transformers Operating Directly On File Bytes", May 31, 2023, 11 pages.

\* cited by examiner

*Primary Examiner* — Trong H Nguyen
(74) *Attorney, Agent, or Firm* — Lee & Hayes, P.C.

(57) ABSTRACT

Methods and systems for injected byte buffer data classification are disclosed. According to an implementation, a security agent can detect process injection events, gather byte buffer data associated with the process injection events, and send the byte buffer data to a security service comprising a byte buffer classification function. The byte buffer classification function can be implemented as a trained transformer type neural network machine learning model, which can analyze the byte buffer data and generate a classification output comprising a probability that the byte buffer data is associated with a malicious process injection.

19 Claims, 7 Drawing Sheets

INJECTED BYTE BUFFER DATA CLASSIFICATION

BACKGROUND

Process injection techniques are often, but not always, used in connection with computing system and network attacks. In an example attack scenario, an adversary uses process injection to execute malicious code while evading detection. The process injection masks tie malicious code under a legitimate process. The malicious code is injected and executed in an address space of the legitimate process, and the malicious code can then be used to gain access to the legitimate process's memory, system/network resources, and possibly elevated privileges.

Meanwhile, process injection is not always malicious. Process injection is also used legitimately by numerous benign or beneficial technologies. Security analyst time is valuable, and it is not reasonable to investigate every process injection event detected in large private networks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for injected byte buffer data classification are disclosed herein. In an example, a malicious process injection security function can optionally be included within a security agent which is deployed in a network environment. The security agent can thereby be configured to detect process injection events in the network environment. In response to a detected process injection event, the security agent can gather byte buffer data associated with the process injection event.

Byte buffer data is a class of data having properties and uses which are generally understood by those of skill in computer science. In general, byte buffer data can be created by a process using an allocation operation which allocates memory for the buffer's content. A wrapping operation can also be used to wrap a byte array into a buffer.

A variety of additional operations can be defined for byte buffer data, including: absolute and relative get and put methods that read and write single bytes, absolute and relative bulk get methods that transfer contiguous sequences of bytes from a buffer into an array, absolute and relative get and put methods that read and write values of other primitive types, translating them to and from sequences of bytes in a particular byte order, methods for creating view buffers which allow a byte buffer to be viewed as a buffer containing values of some other primitive type, and methods of compacting a byte buffer.

A byte buffer can be direct or non-direct. A virtual machine can make a best effort to perform native input/output (I/O) operations directly upon a direct byte buffer, while the virtual machine need not perform native I/O operations directly upon non-direct byte buffer. The virtual machine can avoid copying direct byte buffer content to or from an intermediate buffer before or after each invocation of one of the underlying operating system's native I/O operations.

The security agent can provide byte buffer data to a byte buffer classification function, which can be implemented as a local function or as a remote function accessed via a security service. The byte buffer classification function can be implemented as a trained transformer type neural network machine learning model, which can optionally analyze the byte buffer data in an unmodified form. The byte buffer classification function can generate a classification output comprising a probability that the byte buffer data is associated with a malicious process injection.

In embodiments wherein the byte buffer classification function is accessed via a security service, the security service can return the classification output to the security agent. The security agent can be configured to determine, based on the classification output, whether to take preventive action such as stopping a process associated with the detected process injection event.

In an example, a method for injected byte buffer data classification can be performed via a security agent operating in conjunction with a remote security service. The security agent can detect an injection of code at an endpoint device in a network, wherein the injection of code includes injection of code by a second process into an address space of a first process. The security agent can generate a security event associated with the injection of code, and generating the security event can comprise, e.g., logging injected byte buffer data. The security agent can also optionally truncate the injected byte buffer data, resulting in truncated injected byte buffer data that satisfies a maximum length parameter.

The security agent can then send the injected byte buffer data to the remote security service, which can be implemented outside the network of the security agent. The remote security service can be configured to return to the security agent a classification output comprising a probability that the injected byte buffer data is associated with a malicious process. The remote security service can be adapted to classify the injected byte buffer data by providing the injected byte buffer data as an input to a trained transformer type neural network machine learning model, resulting in the classification output.

The security agent can receive the classification output from the remote security service. In an example, the classification output can comprise at least one floating-point digit between zero and one, and the floating-point digit can represent the probability that the injected byte buffer data is associated with the malicious process. In another example, the classification output can comprise two floating point digits between zero and one. A first of the two floating point digits can represent a probability that the injected byte buffer data is associated with a malicious process injection, while a second of the two floating point digits can represent a probability that the injected byte buffer data is benign. In another example, the classification output can comprise implement a multi-class classification, and can comprise more than two floating point numbers, e.g., three floating point numbers, with one of the numbers representing a probability that the injected byte buffer data is associated with malware, another of the numbers representing a probability that the injected byte buffer data is associated with a potentially unwanted program (PUP), and another of the numbers representing a probability that the injected byte buffer data is benign.

The security agent can determine whether the classification output exceeds a threshold probability that the byte buffer data is associated with the malicious process. If the threshold probability is exceeded, the security agent can stop the malicious process and/or the host process or take any other security measures as appropriate.

The disclosed methods can also include training the transformer type neural network machine learning model, e.g., before deploying the trained model into the security service. For example, training techniques can comprise supplying a training version of the transformer type neural network machine learning model with known benign injected byte buffer data and known malicious injected byte buffer data, thereby enabling the model to learn to accurately classify injected byte buffer data.

Byte buffer truncation can also optionally be performed at the security service, instead of at the security agent. Truncated byte buffer data can satisfy a maximum length parameter and can be provided as input to the trained transformer type neural network machine learning model. The maximum length parameter can be, e.g., in a range from one kilobyte to two kilobytes.

In some examples, classifying the injected byte buffer data can comprise providing the injected byte buffer data in an unmodified or raw form as an input to the trained transformer type neural network machine learning model. Embodiments can thereby avoid a need to determine features of the byte buffer data or to impose a predetermined modality or encoding on the byte buffer data. Embodiments of this disclosure use a "transformer type" neural network machine learning model to classify byte buffer data, which is a novel use of transformer type neural network machine learning models and can yield efficiency and accuracy benefits over previous classification techniques.

Example technical environments in which the disclosed technologies can be applied include, e.g., environments comprising a FALCON® type security agent made by CROWDSTRIKE®. FALCON® sensors can be adapted to gather large amounts of byte buffers (including shell code, digital linked libraries (DLLs), portable executables (PEs), etc.).

Traditionally analysis of sensor-gathered data may have used, e.g., tree-based models. However, these do not capture a file in its entirety, and they impose certain modalities and encodings on the data, which represent assumptions and therefore limit adaptability. This has led to reduced accuracy and prohibitive numbers of false positive classifications.

Process injection can generally be described as a way of evading detection by antivirus and endpoint detection and response solutions, in which executable shell code or DLLs are injected into legitimate processes. Classifying the injected byte sequences is a major challenge, since the sequences are typically only a few kilobytes long. Meanwhile, this disclosure appreciates that their short size means that these events can be sent to the cloud for classification with low network overhead.

Embodiments of this disclosure can use a machine learning model that is configured to operate directly on byte buffer data in substantially unmodified form. The disclosed techniques can thereby effectively automate feature extraction and allow for a model-driven exploration of the representation space, instead of imposing these manually or separately. By applying a machine learning model to the task of classifying process injection events, the disclosed techniques can lead to greater accuracy and reduced false positives despite requiring only short byte buffers as input. Embodiments of this disclosure may also be useful outside of byte buffer classification, e.g., by applying the disclosed techniques to other data types captured by FALCON® or other types of security agents.

A machine learning model, e.g., a transformer-based machine learning model, can be trained on a large dataset of process injection samples, including benign, malicious, obfuscated, and non-obfuscated samples. The model can be designed for continuous learning, being retrained periodically on fresh data to adapt to evolving obfuscation and malware techniques. The model can also optionally be designed based on human feedback.

The model can improve process injection classification through the use of an architecture which does not impose a modality or encoding on injection samples. Instead, the model can read code in its byte form. An example workflow can include, first, training the model on samples of injected code. A trained version of the model can be run as a cloud service, and training can optionally be repeated, periodically or otherwise, using fresh training data for continuous learning/improvement of the model.

Second, a security agent sensor can detect a process injection event and send the injected code (e.g., one kilobyte (kb) of an injected byte buffer) to the cloud service. Third, the model can analyze the injected code and optionally also retain the submitted sample including its metadata for future training. Fourth, the model can output a predicted label back to the security agent. Fifth, based on the predicted label and potentially further indicators, the security agent can optionally halt the execution of the injector process, the injectee (host) process, or both.

Example implementations are provided below with reference to the following figures.

Figure 1A:
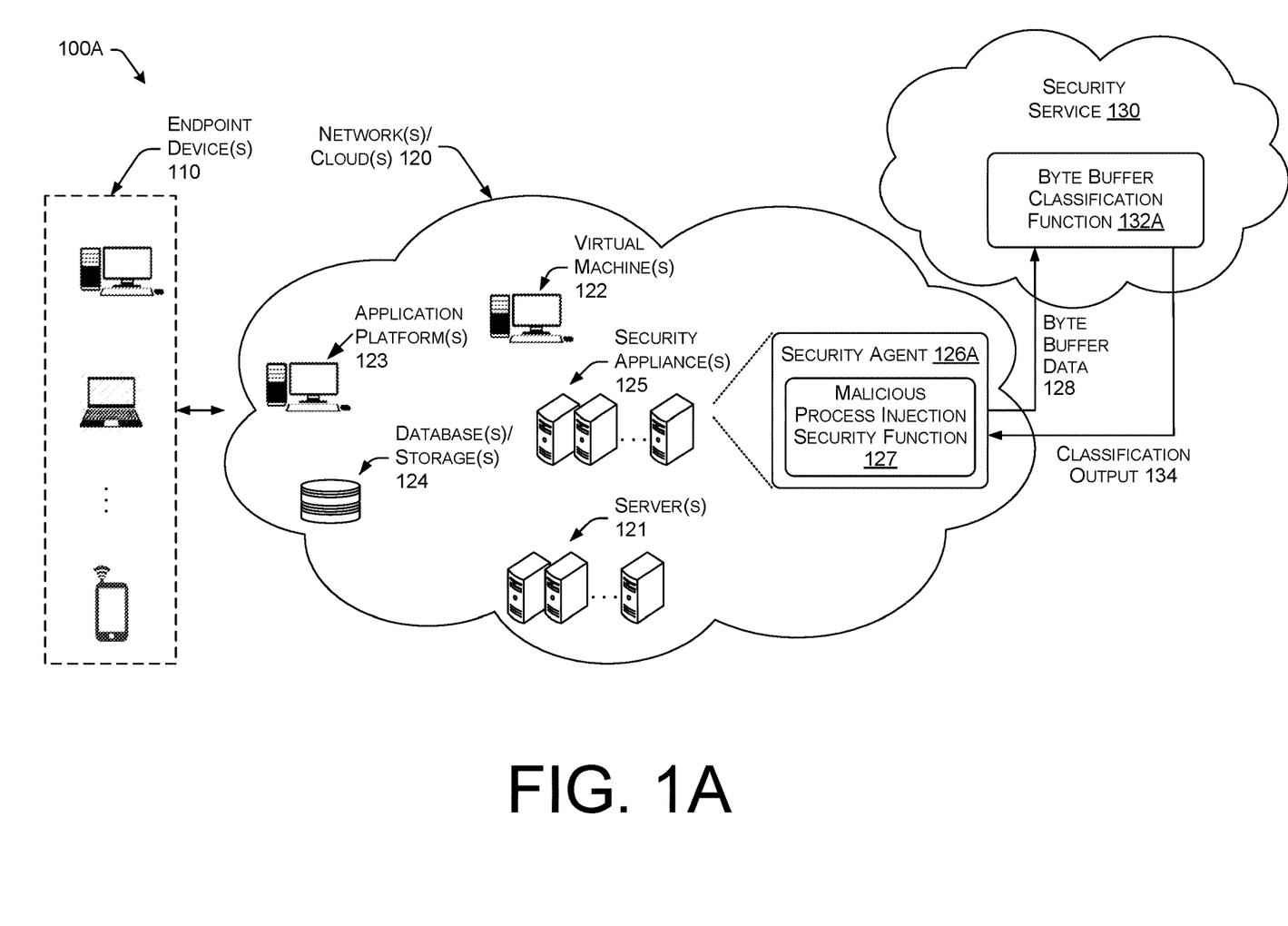
FIG. 1A illustrates an example network environment comprising a security agent equipped with a malicious process injection security function, wherein the malicious process injection security function is adapted to interact with a byte buffer classification function of a security service, in accordance with an embodiment of the present disclosure.

FIG. 1A illustrates an example network environment 100A comprising a security agent 126A equipped with a malicious process injection security function 127, wherein the malicious process injection security function 127 is adapted to interact with a byte buffer classification function 132A of a security service 130, in accordance with an embodiment of the present disclosure.

FIG. 1A comprises endpoint device(s) 110, network(s)/cloud(s) 120, and a security service 130. The network(s)/cloud(s) 120 includes server(s) 121, virtual machine(s) 122, application platform(s) 123, database(s)/storage(s) 124, and security appliance 125. The security appliance 125 can optionally comprise the security agent 126A, and the security agent 126A can comprise the malicious process injection security function 127. The security agent 126A and the dynamic asset inventory function 127 can optionally be supplied to the network(s)/cloud(s) 120 by the security service 130.

In some examples, the malicious process injection security function 127 can be configured to detect a process injection at any device(s) in the network(s)/clouds 120, or alternatively at any of the endpoint device(s) 110. The malicious process injection security function 127 can generate a security event associated with a detected process injection. Generating the security event can comprise, e.g., logging byte buffer data 128. The malicious process injection security function 127 can also optionally truncate byte buffer data to create a truncated version of the byte buffer data 128 to send to the security service 130.

The security agent 126A and/or the malicious process injection security function 127 can then send the byte buffer data 128 to the security service 130 equipped with the byte buffer classification function 132A. The byte buffer classification function 132A can be configured to classify the byte buffer data 128 by providing the byte buffer data 128 as an input to a transformer type neural network machine learning model, resulting in a classification output 134. The security service 130 can then return the classification output 134 to the security agent 126A. The classification output 134 can comprise, e.g., a probability that the byte buffer data 128 is associated with a malicious process.

The security agent 126A and/or the malicious process injection security function 127 can receive the classification output 134 from the security service 130. The security agent 126A and/or the malicious process injection security function 127 can then determine whether the classification output 134 represents a probability which exceeds a threshold probability that the byte buffer data 128 is associated with a malicious process. If the threshold probability is exceeded, the security agent 126A and/or the malicious process injection security function 127 can stop the malicious process and/or the host process or take any other security measures as appropriate.

In further aspects of FIG. 1A, the one or more endpoint device(s) 110 can access, through a network, a variety of resources located in the network(s)/cloud(s) 120. The one or more security appliance(s) 125 can optionally be configured to provide security functions for devices in the network(s)/cloud(s) 120 as well as for endpoint device(s) 110, such as an intrusion detection or prevention system (IDS/IPS), denial-of-service (DoS) attack protection, session monitoring, and other security services. The security agent 126A can comprise a variety of functions that facilitate security of network(s)/cloud(s) 120. In an example, the security agent 126A can be implemented as a FALCON® type agent made by the CROWDSTRIKE® Corporation, and the network(s)/cloud(s) 120 can comprise a private network operated by a business, university, government agency or other entity.

In various examples, the endpoint device(s) 110 can comprise any devices that can connect to the networks/cloud(s) 120, either wirelessly or via direct cable connections. For example, the endpoint device(s) 110 may include but are not limited to mobile telephones, personal digital assistants (PDAs), media players, tablet computers, gaming devices, smart watches, hotspots, personal computers (PCs) such as laptops, desktops, or workstations, or any other type of computing or communication device. In other examples, the endpoint device(s) 110 may comprise vehicle-based devices, wearable devices, wearable materials, virtual reality (VR) devices, smart watches, smart glasses, clothes made of smart fabric, etc.

In various examples, the network(s)/cloud(s) 120 can be a public cloud, a private cloud, or a hybrid cloud and may host a variety of resources such as one or more server(s) 121, one or more virtual machine(s) 122, one or more application platform(s) 123, one or more database(s)/storage(s) 124, etc. The server(s) 121 may include the pooled and centralized server resources related to application content, storage, and/or processing power. The application platform(s) 123 may include one or more cloud environments for designing, building, deploying and managing custom business applications. Virtual desktop(s) may image operating systems and applications of a physical device, e.g., any of endpoint device(s) 110, and allow users to access their desktops and applications from anywhere on any kind of endpoint devices. The database(s)/storage(s) 124 may include one or more of file storage, block storage or object storage.

It should be understood that the one or more server(s) 121, one or more virtual machine(s) 122, one or more application platform(s) 123, and one or more database(s)/storage(s) 124 illustrate multiple functions, available services, and available resources provided by the network(s)/cloud(s) 120. Although shown as individual network participants in FIG. 1A, the server(s) 121, the virtual machine(s) 122, the application platform(s) 123, and the database(s)/storage(s) 124 can be integrated and deployed on one or more computing devices and/or servers in the network(s)/cloud(s) 120.

In implementations, the security appliance(s) 125 can comprise any types of firewalls. Example firewalls include a packet filtering firewall that operates inline at junction points of network devices such as routers and switches. A packet filtering firewall can compare each packet received to a set of established criteria, such as the allowed IP addresses, packet type, port number and other aspects of the packet protocol headers. Packets that are flagged as suspicious are dropped and not forwarded. Example firewalls may further include a circuit-level gateway that monitors transmission control protocol (TCP) handshakes and other network protocol session initiation messages across the network to determine whether the session being initiated is legitimate. Example firewalls may further include an application-level gateway (also referred to as a proxy firewall) that filters packets not only according to the service as specified by the destination port but also according to other characteristics, such as the hypertext transfer protocol (HTTP) request string. Yet another example firewall may be a stateful inspection firewall that monitors an entire session for a state of a connection, while also checking internet protocol (IP) addresses and payloads for more thorough security. A next-generation firewall, as another example firewall, can combine packet inspection with stateful inspection and can also include some variety of deep packet inspection (DPI), as well as other network security systems, such as IDS/IPS, malware filtering and antivirus functions.

In various examples, the security appliance(s) 125 can be deployed as one or more hardware-based appliances, software-based appliances, and/or cloud-based services. A hardware-based appliance may also be referred to as network-based appliance or network-based firewall. The hardware-based appliance can act as a secure gateway between the networks/cloud(s) 120 and the endpoint device(s) 110 and can protect the devices/storages inside the perimeter of the networks/cloud(s) 120 from being attacked by malicious actors.

Additionally or alternatively, the security appliance(s) 125 can be implemented on a cloud device. The security appliance(s) 125 can comprise or can cooperate with a cloud-based security service 130 provided through a managed security service provider (MSSP). A cloud-based service can be delivered to various network participants on demand and configured to track both internal network activity and third-party on-demand environments. In some examples, the security appliance(s) 125 can comprise software-based appliances implemented in part on any of the devices in the network(s)/cloud(s) 120 and/or on the endpoint device(s) 110. Software-based appliances may also be referred to as host-based appliances or host-based firewalls. Software-based appliances may include the security agent 126A or portions thereof, anti-virus software, firewall software, etc., that can be installed on devices in the network(s)/cloud(s) 120 and/or on the endpoint device(s) 110.

In FIG. 1A, the security appliance(s) 125 are shown as individual devices and/or individual cloud participants. However, it should be understood that the network environment 100 may include multiple security appliance(s) respectively implemented on the endpoint device(s) 110 and/or the network(s)/cloud(s) 120. As discussed herein, the security appliance(s) 125 can comprise a hardware-based firewall, a software-based firewall, a cloud-based firewall, or any combination thereof, in addition to the dynamic asset inventory function 127.

While the malicious process injection security function 127 described further herein can optionally be included in a security agent 126A, it should be emphasized that the malicious process injection security function 127 can alternatively be incorporated into other aspects of the network(s)/cloud(s) 120 or at the endpoint device(s) 110. For example, the dynamic asset inventory function 127 can optionally be implemented via the server(s) 121, the virtual machine(s) 122, the application platform(s) 123, and/or the endpoint device(s) 110.

Figure 1B:
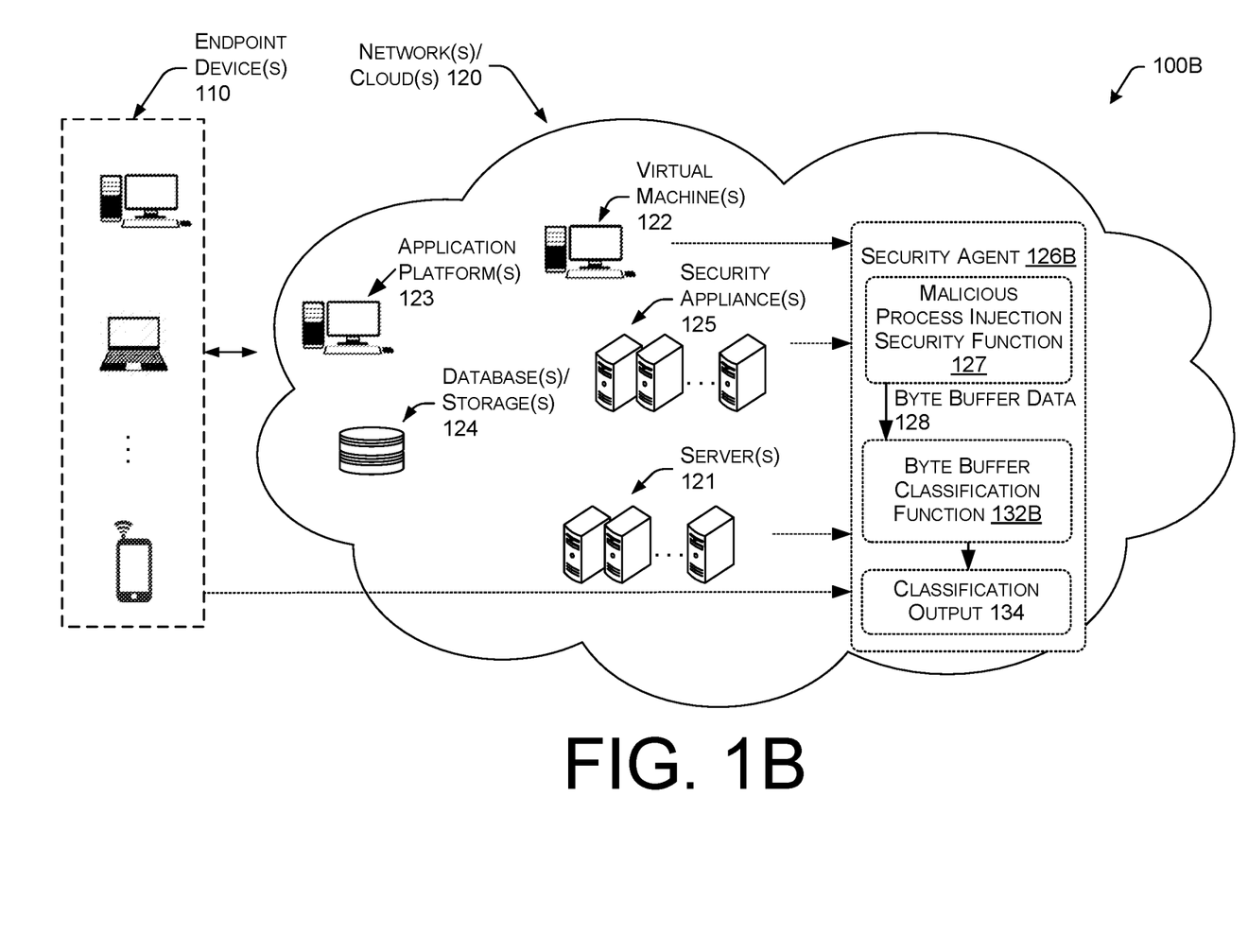
FIG. 1B illustrates an example network environment comprising a security agent equipped with a malicious process injection security function, wherein the malicious process injection security function is adapted to include a byte buffer classification function, in accordance with an embodiment of the present disclosure.

FIG. 1B illustrates an example network environment 100B comprising a security agent 126B equipped with a malicious process injection security function 127, wherein the security agent 126B is adapted to include a byte buffer classification function 132B, in accordance with an embodiment of the present disclosure.

The network environment 100B illustrated in FIG. 1B includes many of the elements introduced in FIG. 1A, with like elements identified by like identifiers. However, in FIG. 1B, the security agent 126B is illustrated as including a local byte buffer classification function 132B. Furthermore, FIG. 1B shows that the security agent 126B can be included within any of the devices in the network environment 100B, including, e.g., any of the virtual machine(s) 122, any of the security appliance(s) 125, any of the server(s) 121, and/or any of the endpoint device(s) 110.

In an example according to FIG. 1B, the security agent 126B may be implemented at multiple endpoint devices of the endpoint device(s) 110. Any given endpoint device may therefore use the malicious process injection security function 127 to detect a process injection at the endpoint device. The malicious process injection security function 127 can generate a security event associated with a detected process injection. Generating the security event can comprise, e.g., logging byte buffer data 128. The malicious process injection security function 127 can also optionally truncate byte buffer data to create a truncated version of the byte buffer data 128.

The security agent 126B and/or the malicious process injection security function 127 can then supply the byte buffer data 128 to the byte buffer classification function 132B. The byte buffer classification function 132B can be configured to classify the byte buffer data 128 by providing the byte buffer data 128 as an input to a transformer type neural network machine learning model, resulting in a classification output 134. The byte buffer classification function 132B can output the classification output 134 to the security agent 126B. The classification output 134 can comprise, e.g., a probability that the byte buffer data 128 is associated with a malicious process.

The security agent 126B can then determine whether the classification output 134 represents a probability which exceeds a threshold probability that the byte buffer data 128 is associated with a malicious process. If the threshold probability is exceeded, the security agent 126B can stop the malicious process and/or the host process or take any other security measures as appropriate.

Figure 2:
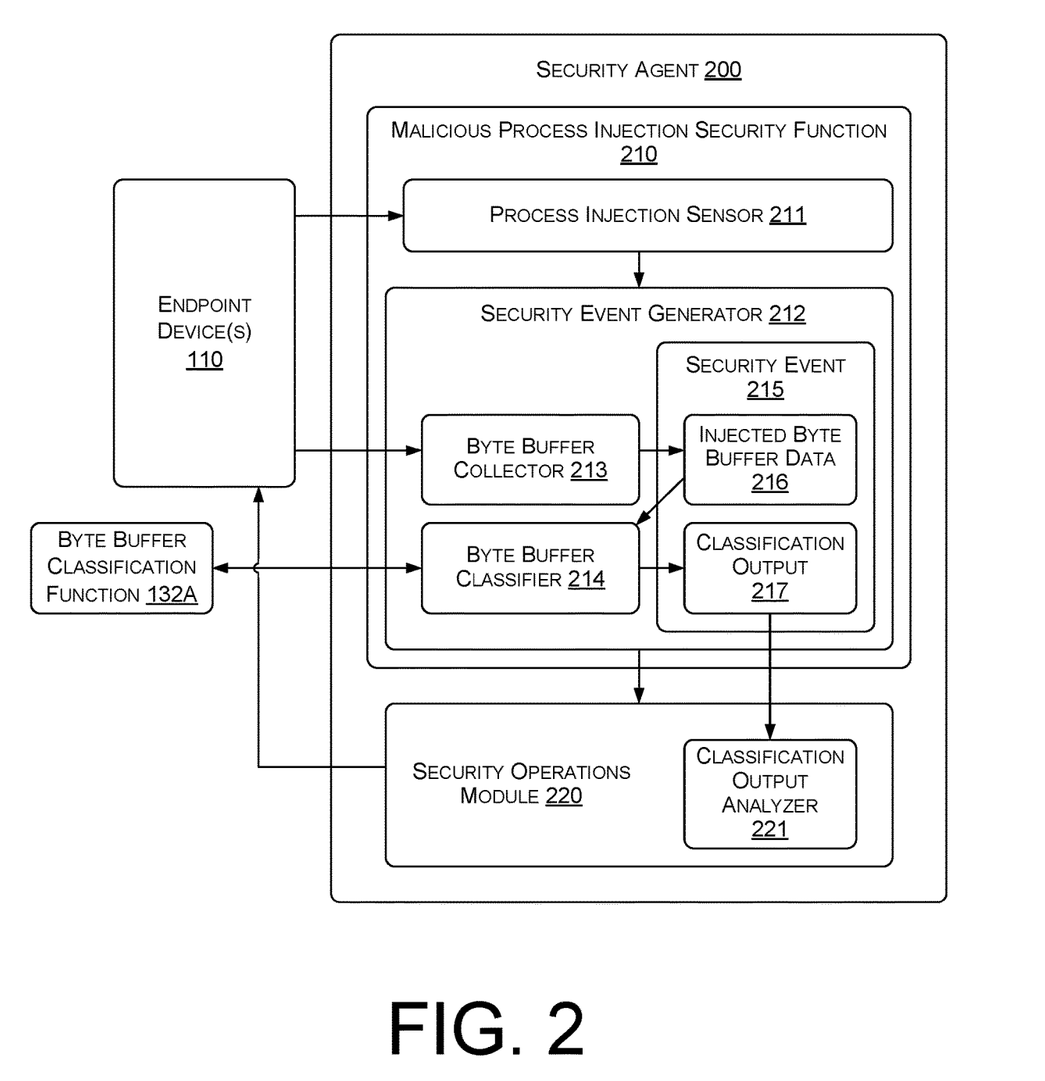
FIG. 2 illustrates an example security agent comprising a malicious process injection security function, and example components and operations thereof in accordance with an embodiment of the present disclosure.

FIG. 2 illustrates an example security agent 200 comprising a malicious process injection security function 210, and example components and operations thereof in accordance with an embodiment of the present disclosure. The security agent 200 and malicious process injection security function 210 can implement the security agent 126A and the malicious process injection security function 127 introduced in FIG. 1A in some embodiments. Furthermore, the security agent 200 and malicious process injection security function 210 can implement at least a portion of the security agent 126B and the malicious process injection security function 127 introduced in FIG. 1B, as will be appreciated. The security agent 200 can also optionally comprise other functions other than the malicious process injection security function 210, as described in connection with FIG. 1A.

The example security agent 200 and components thereof can interact with the endpoint devices 110 as well as the byte buffer classification function 132A, introduced in FIG. 1A. In the illustrated configuration, the malicious process injection security function 210 can comprise a process injection sensor 211 and a security event generator 212. The security event generator 212 can comprise a byte buffer collector 213, a byte buffer classifier 214, and an example security event 215. The security event 215 can comprise injected buffer data 216 and a classification output 217.

The example security agent 200 can further comprise a security operations module 220 that is configured to interact with the malicious process injection security function 210. The security operations module 220 can comprise, inter alia, a classification output analyzer 221.

In an example according to FIG. 2, the process injection sensor 211 can be configured to monitor one or more of the endpoint device(s) 110 for process injection events. In response to a detected process injection, the process injection sensor 211 can notify the security event generator 212. The security event generator 212 can create the security event 215 and can activate the byte buffer collector 213 to collect injected byte buffer data 216 associated with the detected process injection. The byte buffer collector 213 can optionally truncate injected byte buffer data before logging the injected byte buffer data 216 with the security event 215.

The security event generator 212 can next activate the byte buffer classifier 214 to determine whether the byte buffer data 216 is benign or malicious. The byte buffer classifier 214 can send the byte buffer data 216 to the byte buffer classification function 132A, which can optionally be implemented at a remote security service as illustrated in FIG. 1A. The byte buffer classification function 132A can return a classification output 217 to the byte buffer classifier 214, and the classification output 217 can be logged or otherwise stored with the security event 215.

The classification output 217 can comprise, for example, at least one floating-point digit between zero and one, and the floating-point digit can represent the probability that the injected byte buffer data 216 is associated with a malicious process. In another example, the classification output 217 can comprise two floating point digits between zero and one. A first of the two floating point digits can represent a probability that the injected byte buffer data 216 is associated with a malicious process injection, while a second of the two floating point digits can represent a probability that the injected byte buffer data 216 is benign.

The security event 215 can be provided to the security operations module 220. In particular, the classification output 217 can be provided to the classification output analyzer 221. The classification output analyzer 221 can be configured to determine whether the classification output 217 exceeds a threshold probability that the injected byte buffer data 216 is associated with a malicious process.

Different threshold probabilities can optionally be applied by different security agents. Furthermore, a single security agent such as security agent 200 can optionally apply different threshold probabilities in connection with different endpoint devices of the endpoint device(s) 110. Some example threshold probabilities can comprise, e.g., threshold probabilities in a range from 0.5-0.95. A threshold probability of 0.5 can represent a 50% probability that the injected byte buffer data 216 is associated with a malicious process, and a threshold probability of 0.95 can represent a 95% probability that the injected byte buffer data 216 is associated with a malicious process.

In an embodiment wherein the classification output analyzer 221 is configured with a threshold probability of 0.75, for example, then the classification output analyzer 221 can determine whether the classification output 217 exceeds 0.75. If so, the classification output analyzer 221 can activate the security operations module 220 to take protective action against the detected malicious process, for example by stopping the malicious process and/or the host process at an endpoint device of the endpoint device(s) 110, or by taking any other security measures as appropriate.

Figure 3:
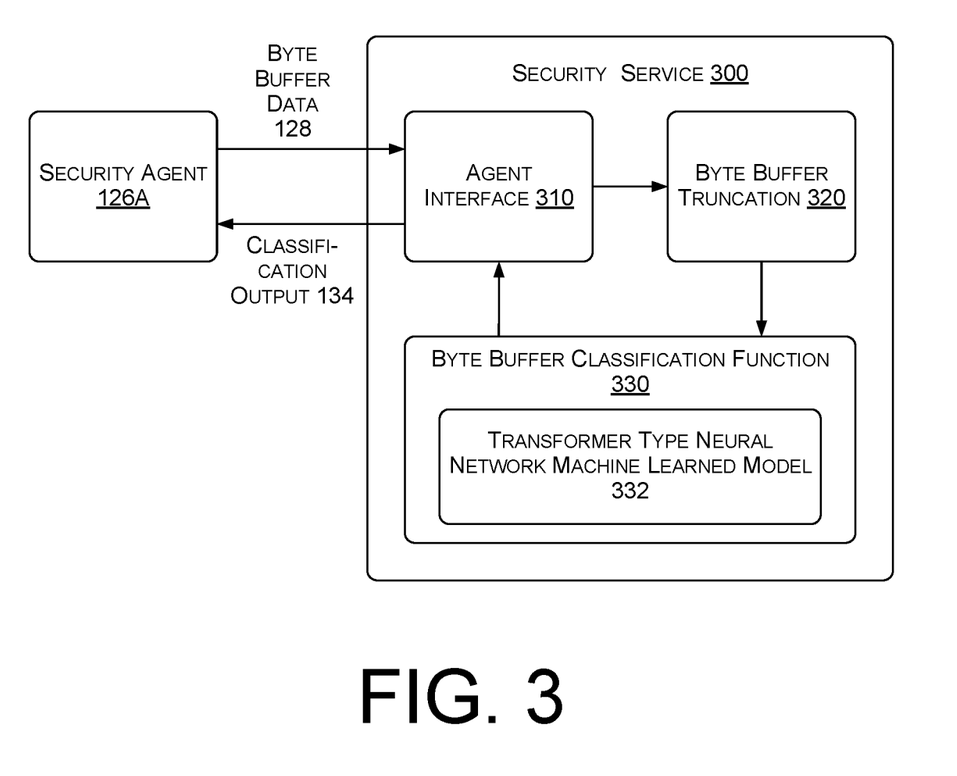
FIG. 3 illustrates an example security service comprising a byte buffer classification function, and example components and operations thereof in accordance with an embodiment of the present disclosure.

FIG. 3 illustrates an example security service 300 comprising a byte buffer classification function 330, and example components and operations thereof in accordance with an embodiment of the present disclosure. The security service 300 can implement the security service 130 introduced in FIG. 1A in some embodiments. Furthermore, components of the security service 300 can implement at least a portion of the security agent 126B introduced in FIG. 1B, as will be appreciated.

The example security service 130 and components thereof can interact with the security agent 126A, introduced in FIG. 1A. In the illustrated configuration, the security service 130 can comprise an agent interface 310, byte buffer truncation 320, and a byte buffer classification function 330. The byte buffer classification function 330 can comprise a transformer type neural network machine learning model 332.

In an example according to FIG. 3, the security agent 126A can send byte buffer data 128 to the security service 130 for classification thereof, by sending the byte buffer data 128 to the agent interface 310. The agent interface 310 can log an identifier of the security agent 126A that requested classification and can pass the byte buffer data 128 to byte buffer truncation 320. Byte buffer truncation 320 can be configured to truncate the byte buffer data 128 to a predetermined length, e.g., to a length in a range of 0.5 kb to 2.5 kb, or any other desired length. Byte buffer truncation 320 can be configured to pass a truncated version of the byte buffer data 128 to byte buffer classification function 330 comprising the transformer type neural network machine learning model 332.

The byte buffer classification function 330 can be configured to provide the truncated version of the byte buffer data 128 as an input to the transformer type neural network machine learning model 332, and the transformer type neural network machine learning model 332 can be configured to process the truncated version of the byte buffer data 128 and generate the classification output 134.

The classification output 134 can comprise at least one floating-point digit between zero and one, and the floating-point digit can represent the probability that the injected byte buffer data is associated with the malicious process. In another example, the classification output 134 can comprise two floating point digits between zero and one. A first of the two floating point digits can represent a probability that the injected byte buffer data is associated with a malicious process injection, while a second of the two floating point digits can represent a probability that the injected byte buffer data is benign.

The trained transformer type neural network machine learning model 332 can implement a deep learning architecture based on the multi-head attention mechanism. It need not use recurrent units and it can be trained more quickly than previous recurrent neural network architectures, such as long short-term memory (LSTM) type architectures. While some transformer type neural networks have been applied in the context of large language models, they have not previously been applied in the context disclosed herein. Furthermore, some examples can use a ByteInjection type model as the transformer type neural network machine learning model 332.

In example operations of the transformer type neural network machine learning model 332, input byte buffer data 128 can be split into n-grams encoded as tokens and each token can be converted into a vector. At each layer, each token can then be contextualized within the scope of a context window with other (unmasked) tokens via a parallel multi-head attention mechanism, allowing a signal for key tokens to be amplified, while the signal for less important tokens can be diminished.

The byte buffer classification function 330 can then provide the classification output 134 to the agent interface 310. The agent interface 310 can look up the logged identifier of the security agent 126A that requested the classification output 134, and the agent interface 310 can send the classification output 134 to the security agent 126A.

Figure 4:
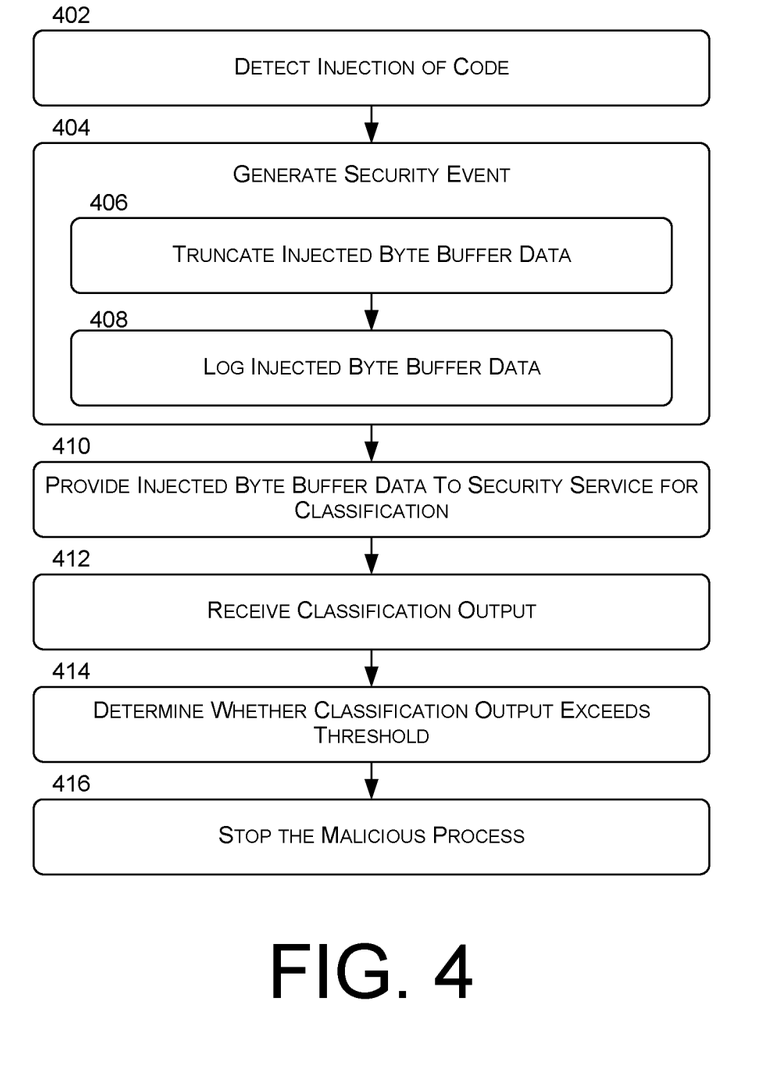
FIG. 4 illustrates an example process performed by a malicious process injection security function, in accordance with an embodiment of the present disclosure.

FIG. 4 illustrates an example process performed by a malicious process injection security function, in accordance with an embodiment of the present disclosure. By way of example and without limitation, the process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

The operations illustrated in FIG. 4 can be performed at least in part by a malicious process injection security function such as the malicious process injection security function 210 illustrated in FIG. 2. Operation 402 comprises detecting injection of code, e.g., detecting, by a security agent 200 equipped with the malicious process injection security function 210, an injection of code at an endpoint device of the endpoint device(s) 110 in the networks/clouds 120. The injection of code can include, e.g., an injection of code by a second process into an address space of a first process.

Operation 404 comprises generating as security event. For example, the security agent 200 can generate the security event 215 associated with the injection of code. Generating the security event 215 can comprise operations 406 and 408. At operation 406, the security agent 200 can truncate the injected byte buffer data 216, resulting in truncated injected byte buffer data that satisfies a maximum length parameter. At operation 408, the security agent 200 can log the optionally truncated version of the injected byte buffer data 216.

Operation 410 comprises providing the injected byte buffer data 216 to the security service 130 for classification. For example, the security agent 200 can send the injected byte buffer data 216 to the security service 130 comprising the byte buffer classification function 132A. The security service 130 can optionally be remote, i.e., outside the network(s)/cloud(s) 120 and can be configured to return a classification output 134 comprising a probability that the injected byte buffer data 216 is associated with a malicious process. The security service 130 can be adapted to classify the injected byte buffer data 216 by providing the injected byte buffer data 216 as an input to a trained transformer type neural network machine learning model, resulting in the classification output 134.

Operation 412 comprises receiving, by the security agent 200, the classification output 134 from the security service 130. The classification output 134 can comprise, e.g., at least one floating-point digit between zero and one, wherein the floating-point digit represents the probability that the injected byte buffer data 216 is associated with the malicious process. In some embodiments, the classification output 134 can comprise two floating-point digits between zero and one, as described herein.

Operation 414 comprises determining, by the security agent 200, whether the classification output 134 exceeds a threshold. The threshold can comprise, e.g., a threshold probability that the byte buffer data 216 is associated with the malicious process. If the classification output 134 exceeds the threshold, then at operation 416 the security agent 200 can take action to address the security threat, e.g., by stopping the malicious process. Stopping the malicious process can comprise stopping the host process, blocking IP addresses or ports used by the malicious process, or other security measures.

Figure 5:
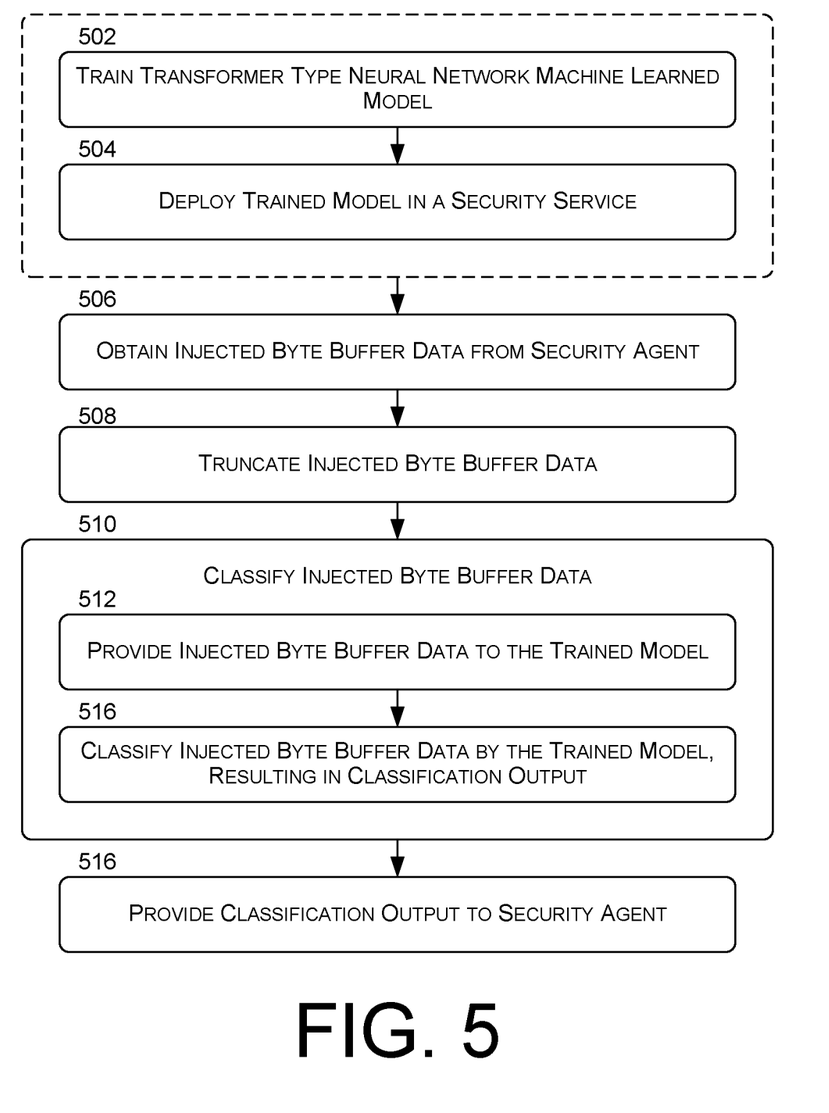
FIG. 5 illustrates an example process performed by a byte buffer classification function, in accordance with an embodiment of the present disclosure.

FIG. 5 illustrates an example process performed by a byte buffer classification function, in accordance with an embodiment of the present disclosure. By way of example and without limitation, the process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

FIG. 5 illustrates a first group of operations, including operation 502 and operation 504, to train and deploy a machine learning model, and a second group of operations, including operations 506, 508, 510, 512, 514, and 516, to use the deployed machine learning model.

At operation 502, a first group of devices in a testing and training environment can train a transformer type neural network machine learning model. For example, a training version of the transformer type neural network machine learning model can be supplied with known benign injected byte buffer data and known malicious injected byte buffer data, thereby enabling the training version to learn to accurately assess a probability that newly evaluated injected byte buffer data is malicious. The result of operation 502 can be a trained transformer type neural network machine learning model. At operation 504, the trained model can be deployed in a security service. For example, the trained transformer type neural network machine learning model 332 can be deployed in the security service 300.

In general, training the transformer type neural network machine learning model can use a ByteInjection type model, which shows promise to yield satisfactory performance when classifying process injection byte buffers. Process injection events are generally short, with lengths around several hundred bytes to a few kilobytes. Therefore, byte buffers with lengths up to a length of 1 kb, i.e. 2,000 characters in hex representation can be used for classification, with truncation being used to ensure the maximum length is not exceeded.

Clean data can be gathered from frequent process injections known to be benign. Dirty data can be gathered using known malicious injections. Labels can be applied according to the source of the byte buffer. In order to make best use of the malicious byte buffers, embodiments can augment the dataset using a variant generator technology such as metame and/or using public malicious shell code repositories.

For the clean data, a large group (e.g., 5000) of the most prevalent unique values of executable bytes can be collected. The more frequent byte buffers appear many times more often than the less frequent byte buffers, and so embodiments can subsample the data such that byte buffers appear with around the same frequency.

In order to achieve a desired diversity of the dataset, embodiments may again apply a variant generator technology to create variants by replacing certain opcodes with variants that are identical in effect but use different opcodes.

For the dirty data, in order to make the best use of limited samples, embodiments can apply the variant generator technology. Embodiments can discard buffers for which opcode reassembly didn't work (e.g., after reassembly they still contain opcodes followed by ';') as well as buffers which have certain properties, e.g., less than 128 non-zero bytes. Malicious shell code from a public source such as exploit-db.com or shell-storm.org can also be used to supplement this dataset.

The transformer type neural network machine learning model can use an architecture similar to the byteformer model that has shown positive results when applied to image and audio classification. In those domains, a transformer model operates on file bytes directly in order to do image and audio file classification without decoding those files. Long byte sequences (tens of thousands or more) require a combination of adjustments in architecture to reduce the memory & training complexity of the models, e.g., limiting the attention mechanism to a local area (shifted window attention), and down sampling within the transformer layer.

Using a byteformer-style model for malware classifications means that sample file bytes can directly be used as model input, without previous feature extraction. The model can then predict the probability of a given byte buffer to be clean or dirty in the form of a 2-vector with a probability value for each class.

At operation 506, the security service 300 can obtain injected byte buffer data 128 from a security agent 126A. The injected byte buffer data 128 can comprise data resulting from an injection of code by a second process into an address space of a first process, e.g., at an endpoint that is served by the security agent 126A. The security agent 126A can comprise a network security agent in a network and obtaining the injected byte buffer data 128 from the security agent 126A can optionally comprise receiving the injected byte buffer data 128 at a remote security service outside the network of the security agent 126A.

As described with reference to FIG. 4, the security agent 126A can be configured to detect the injection of code at an endpoint device in a network, generate a security event associated with the injection of code, wherein generating the security event comprises logging the injected byte buffer data 128, and send the injected byte buffer data 128 to a security service 300 outside the network and configured to perform the operations 506, 508, 510, 512, 514, and 516.

At operation 508, the security service 300 can truncate the injected byte buffer data 128, resulting in truncated injected byte buffer data that satisfies a maximum length parameter. The maximum length parameter can be, e.g., in a range from one kilobyte to two kilobytes. The truncated injected byte buffer data can be provided as the input to the transformer type neural network machine learning model 332 at operation 512.

At operation 510, the security service 300 can classify the injected byte buffer data 128. Operation 510 can comprise operations 512 and 514. At operation 512, the security service 300 can provide the injected byte buffer data 128 as an input to the trained model, i.e., to the transformer type neural network machine learning model. At least a portion of the injected byte buffer data 128 can be provided to the transformer type neural network machine learning model, for example, in an unmodified form, i.e., in a same form as encountered in the byte buffer or other memory of the endpoint device from which it was gathered.

At operation 514, the transformer type neural network machine learning model can classify the injected byte buffer data 128, resulting in a classification output 134. The classification output 134 can comprise a probability that the injected byte buffer data 128 is associated with a malicious process injection. In some embodiments, the classification output 134 can comprise two floating point digits between zero and one, wherein a first of the two floating point digits represents the probability that the injected byte buffer data 128 is associated with the malicious process injection, and wherein a second of the two floating point digits represents a probability that the injected byte buffer data 128 is benign.

After the classification output 134 is generated at operation 514, the security service 300 can provide the classification output 134 to the security agent 126A at operation 516.

Figure 6:
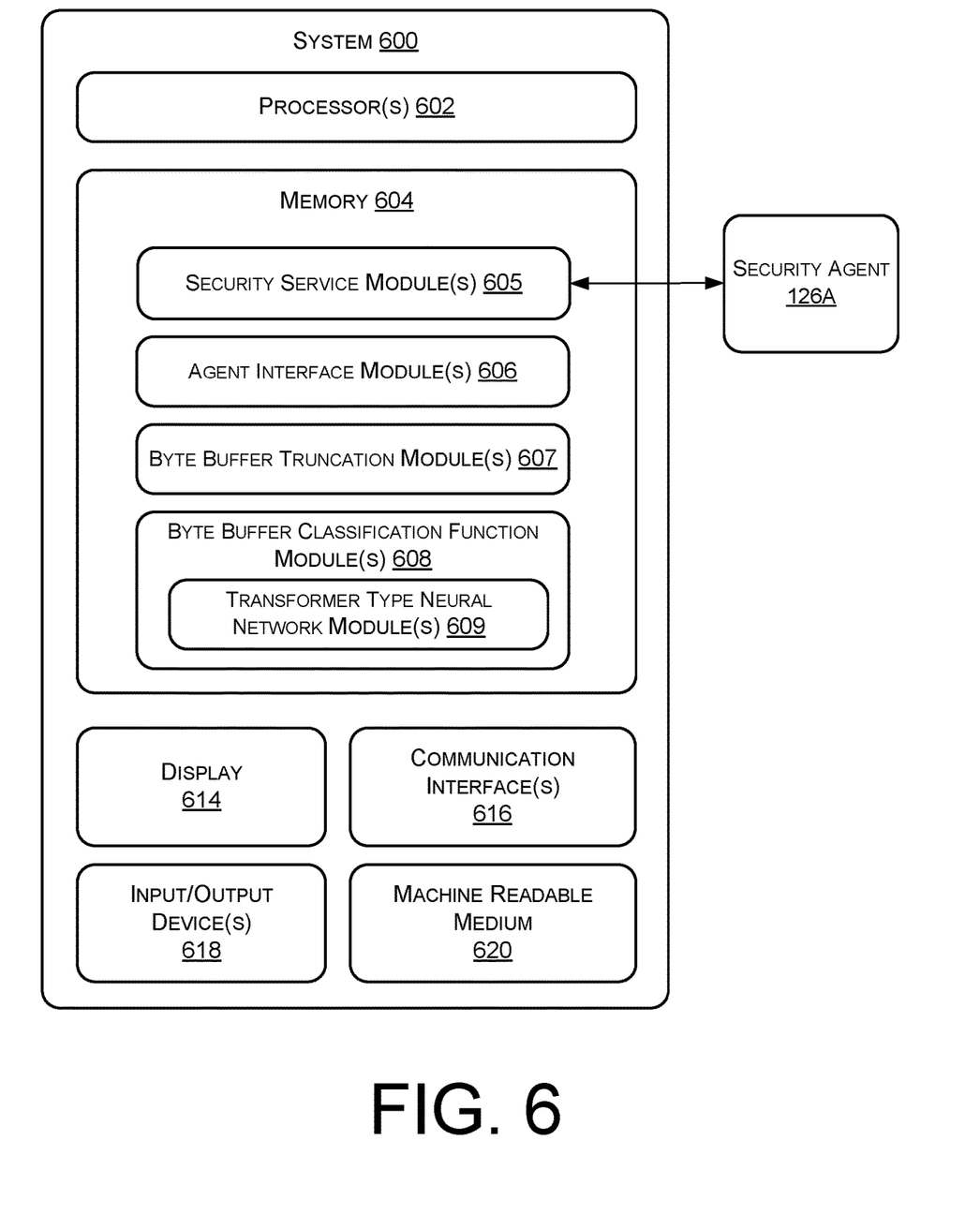
FIG. 6 illustrates an example system configured for byte buffer classification, in accordance with an embodiment of the present disclosure.

FIG. 6 illustrates an example system configured for byte buffer classification, in accordance with an embodiment of the present disclosure. The example system 600 can be implemented as one or more computing devices as may be included in a security service 130, as illustrated in FIG. 1A.

As illustrated in FIG. 6, a system 600 may comprise processor(s) 602, a communication interface(s) 616, and/or a machine readable medium 620. The system 600 may optionally further comprise a display 614 and input/output device(s) 618, however the system need not necessarily incorporate the display 614 and input/output device(s) 618 in all embodiments. Furthermore, the system 600 can comprise a memory 604 storing security service module(s) 605, agent interface module(s) 606, byte buffer truncation module(s) 607, byte buffer classification function module(s) 608, and transformer type neural network module(s) 609. The security service module(s) 605 can optionally interact with a security agent 126A which can optionally be implemented separately from the system 600.

In various examples, the processor(s) 602 can be a central processing unit (CPU), a graphics processing unit (GPU), or both CPU and GPU, or any other type of processing unit. Each of the one or more processor(s) 602 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 602 may also be responsible for executing all computer applications stored in memory 604, which can be associated with common types of volatile (RAM) and/or nonvolatile (ROM) memory.

In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the system 600. Any such non-transitory computer-readable media may be part of the system 600.

The memory 604 can include module(s) which, when executed, cause the processor(s) 602 to perform actions described herein. The security service module(s) 605, agent interface module(s) 606, byte buffer truncation module(s) 607, byte buffer classification function module(s) 608, and transformer type neural network module(s) 609 can comprise modules cause the processor(s) 602 to perform functions of components illustrated and described in FIGS. 1-5. The transformer type neural network module(s) 609 can be a constituent part of the byte buffer classification function module(s) 608, as shown.

Display 614 can be a liquid crystal display or any other type of display commonly used in the system 600. For example, display 614 may be a touch-sensitive display screen and can then also act as an input device or keypad, such as for providing a soft-key keyboard, navigation buttons, or any other type of input.

Input/output device(s) 618 can include any sort of output devices known in the art, such as display 614, speakers, a vibrating mechanism, and/or a tactile feedback mechanism. Input/output device(s) 618 can also include ports for one or more peripheral devices, such as headphones, peripheral speakers, and/or a peripheral display. Input/output device(s) 618 can include any sort of input devices known in the art. For example, input/output device(s) 618 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The communication interface(s) 616 can include transceivers, modems, interfaces, antennas, and/or other components that perform or assist in exchanging radio frequency (RF) communications with base stations of the telecommunication network, a Wi-Fi access point, and/or otherwise implement connections with one or more networks.

The machine readable medium 620 can store one or more sets of instructions, such as software or firmware, that embodies any one or more of the methodologies or functions described herein. The instructions can also reside, completely or at least partially, within the memory 604, processor(s) 602, and/or communication interface(s) 616 during execution thereof by the system 600. The memory 604 and the processor(s) 602 also can constitute machine readable media 620.

The various techniques described herein may be implemented in the context of computer-executable instructions or software, such as program components, that are stored in computer-readable storage and executed by the processor(s) of one or more computing devices such as those illustrated in the figures. Generally, program components include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, comprising:
   obtaining injected byte buffer data from a security agent, the injected byte buffer data having resulted from data being injected into a byte buffer;
   classifying the injected byte buffer data, comprising:
      providing the injected byte buffer data as an input to a trained transformer type neural network machine learning model, wherein at least a portion of the injected byte buffer data is provided to the trained transformer type neural network machine learning model in an unmodified form without determining features of the injected byte buffer data or imposing a modality or encoding on the injected byte buffer data,
      classifying the injected byte buffer data by the trained transformer type neural network machine learning model, resulting in a classification output,
      wherein the classification output indicates whether the injected byte buffer data is associated with a malicious process injection; and
   providing the classification output to the security agent.

2. The method of claim 1, wherein the injected byte buffer data comprises data resulting from an injection of code by a second process into an address space of a first process.

3. The method of claim 2, wherein the security agent comprises a network security agent configured to:
   detect the injection of code at an endpoint device in a network;
   generate a security event associated with the injection of code, wherein the generating the security event comprises logging the injected byte buffer data; and
   send the injected byte buffer data to a remote security service outside the network and configured to perform the obtaining and the classifying; or
   provide the injected byte buffer data to a local byte buffer classification function configured to perform the obtaining and the classifying.

4. The method of claim 1, further comprising truncating the injected byte buffer data, resulting in truncated injected byte buffer data that satisfies a maximum length parameter, and wherein the truncated injected byte buffer data is provided as the input to the trained transformer type neural network machine learning model.

5. The method of claim 4, wherein the maximum length parameter is in a range from one kilobyte to two kilobytes.

6. The method of claim 1, wherein the classification output comprises two floating point digits between zero and one, wherein a first of the two floating point digits represents a probability that the injected byte buffer data is associated with the malicious process injection, and wherein a second of the two floating point digits represents a probability that the injected byte buffer data is benign.

7. The method of claim 1, further comprising training a training version of the trained transformer type neural network machine learning model, by supplying the training version with known benign injected byte buffer data and known malicious injected byte buffer data.

8. The method of claim 1, wherein the security agent comprises a network security agent in a network, wherein the obtaining the injected byte buffer data from the security agent comprises receiving the injected byte buffer data at a security service outside the network, and wherein the providing the classification output to the security agent comprises providing the classification output by the security service to the security agent.

9. A system, comprising:
a processor, and
at least one memory storing instructions executed by the processor to perform actions including:
obtaining injected byte buffer data from a security agent, the injected byte buffer data having resulted from data being injected into a byte buffer;
classifying the injected byte buffer data, comprising:
providing the injected byte buffer data as an input to a trained transformer type neural network machine learning model, wherein at least a portion of the injected byte buffer data is provided to the trained transformer type neural network machine learning model in an unmodified form without determining features of the injected byte buffer data or imposing a modality or encoding on the injected byte buffer data,
classifying the injected byte buffer data by the trained transformer type neural network machine learning model, resulting in a classification output, wherein the classification output comprises an indication of whether the injected byte buffer data is associated with a malicious process; and
providing the classification output to the security agent.

10. The system of claim 9, wherein the byte buffer data comprises injected byte buffer data resulting from an injection of code by a second process into an address space of a first process.

11. The system of claim 10, wherein the security agent comprises a network security agent configured to detect the injection of code at an endpoint device in a network.

12. The system of claim 9, wherein the actions further comprise truncating the byte buffer data, resulting in truncated byte buffer data that satisfies a maximum length parameter, and wherein the truncated byte buffer data is provided as the input to the trained transformer type neural network machine learning model.

13. The system of claim 9, wherein the classification output comprises at least one floating-point digit between zero and one, wherein the floating-point digit represents the indication of whether the byte buffer data is associated with the malicious process.

14. The system of claim 9, wherein the security agent comprises a network security agent in a network, wherein the obtaining the byte buffer data from the security agent comprises receiving the byte buffer data at a security service outside the network, and wherein the providing the classification output to the security agent comprises providing the classification output by the security service to the security agent.

15. A non-transitory computer-readable storage medium storing computer-readable instructions, that when executed by a processor, cause the processor to perform actions comprising:
detecting, by a network security agent in a network, an injection of code at an endpoint device in a network;
generating, by the network security agent, a security event associated with the injection of code, wherein the generating the security event comprises logging injected byte buffer data, the injected byte buffer data having resulted from data being injected into a byte buffer;
sending, by the network security agent, the injected byte buffer data to a remote security service outside the network and configured to return a classification output comprising a probability that the injected byte buffer data is associated with a malicious process, wherein at least a portion of the injected byte buffer data is provided to a trained transformer type neural network machine learning model in an unmodified form without determining features of the injected byte buffer data or imposing a modality or encoding on the injected byte buffer data;
receiving, by the network security agent, the classification output from the remote security service;
determining, by the network security agent, whether the classification output exceeds a threshold probability that the injected byte buffer data is associated with the malicious process; and
stopping, by the network security agent, the malicious process in response to the determining that the classification output exceeds the threshold probability.

16. The non-transitory computer-readable storage medium of claim 15, wherein the remote security service is adapted to classify the injected byte buffer data by providing the injected byte buffer data as an input to a trained transformer type neural network machine learning model, resulting in the classification output, wherein the at least a portion of the injected byte buffer data is provided to the trained transformer type neural network machine learning model in the unmodified form.

17. The non-transitory computer-readable storage medium of claim 15, wherein the classification output comprises at least one floating-point digit between zero and one, wherein the floating-point digit represents the probability that the injected byte buffer data is associated with the malicious process.

18. The non-transitory computer-readable storage medium of claim 15, wherein the injection of code includes injection of code by a second process into an address space of a first process.

19. The non-transitory computer-readable storage medium of claim 15, wherein the actions further comprise truncating the injected byte buffer data, resulting in truncated injected byte buffer data that satisfies a maximum length parameter.

* * * * *